US012608191B2

(12) United States Patent
Shinohara et al.

(10) Patent No.: US 12,608,191 B2
(45) Date of Patent: Apr. 21, 2026

(54) UPDATE CONTROL METHOD OF CONTAINER INFRASTRUCTURE CLUSTER, UPDATE SYSTEM OF CONTAINER INFRASTRUCTURE CLUSTER, UPDATE CONTROL DEVICE, AND UPDATE CONTROL PROGRAM

(71) Applicant: NTT, Inc., Tokyo (JP)

(72) Inventors: Kenta Shinohara, Musashino (JP);
Noritaka Horikome, Musashino (JP);
Takahiro Terayama, Musashino (JP);
Masaki Ueno, Musashino (JP)

(73) Assignee: NTT, Inc., Tokyo (JP)

( * ) Notice: Subject to any disclaimer, the term of this patent is extended or adjusted under 35 U.S.C. 154(b) by 341 days.

(21) Appl. No.: 18/570,134

(22) PCT Filed: Jun. 28, 2021

(86) PCT No.: PCT/JP2021/024331
§ 371 (c)(1),
(2) Date: Dec. 14, 2023

(87) PCT Pub. No.: WO2023/275926
PCT Pub. Date: Jan. 5, 2023

(65) Prior Publication Data
US 2024/0281242 A1     Aug. 22, 2024

(51) Int. Cl.
*G06F 8/65*     (2018.01)
(52) U.S. Cl.
CPC ..................................... *G06F 8/65* (2013.01)
(58) Field of Classification Search
CPC ........................... G06F 8/65; G06F 2009/4557
See application file for complete search history.

(56) References Cited

U.S. PATENT DOCUMENTS

| | | | | |
|---|---|---|---|---|
| 11,469,944 | B1 * | 10/2022 | Lindholm | H04L 41/0897 |
| 12,160,340 | B2 * | 12/2024 | Erez | H04L 63/0823 |
| 2019/0050296 | A1 * | 2/2019 | Luo | G06F 11/1456 |
| 2019/0324785 | A1 * | 10/2019 | Weissman | G06F 9/45558 |
| 2020/0153898 | A1 * | 5/2020 | Sabath | G06F 9/4856 |

(Continued)

FOREIGN PATENT DOCUMENTS

CN      113704029 A   * 11/2021   .......... G06F 11/2028

OTHER PUBLICATIONS

Be-ars.colopl.co.jp [online], "How 'Dragon Quest Walk' adopted a Kubernetes multi-cluster configuration," available on Jan. 2021, retrieved on Jan. 2021, retrieved from URL<https://be-ars.colopl.co.jp/team/en-blog_vol6.html>, 17 pages (with machine translation).

(Continued)

*Primary Examiner* — Daxin Wu
(74) *Attorney, Agent, or Firm* — Fish & Richardson P.C.

(57)                    ABSTRACT

An update control device of a container-based cluster update system constructs a master node in a new container-based cluster and constructs a minimum number of worker nodes required to execute a migration target application. The update control device deletes a migration target application of a container-based cluster in an initial state, deletes a worker node in which no application is installed, adds the worker node to a new container-based cluster, and sequentially migrates the migration target application to perform update.

4 Claims, 12 Drawing Sheets

(56) References Cited

U.S. PATENT DOCUMENTS

| | | | |
|---|---|---|---|
| 2021/0279111 A1* | 9/2021 | Ranjan | G06F 9/455 |
| 2022/0075613 A1* | 3/2022 | Ramachandran | G06F 9/45558 |
| 2022/0114004 A1* | 4/2022 | Hsu | G06F 9/547 |
| 2022/0229687 A1* | 7/2022 | Singhal | G06F 9/45558 |

OTHER PUBLICATIONS

Kubernetes.io [online], "Performing Rolling Updates," available on or before Jun. 2019, retrieved on Oct. 2023, retrieved from URL<https://kubernetes.io/ja/docs/tutorials/kubernetes-basics/update/update-intro/>, 5 pages (with machine translation).
Redhat.com [online], "What is blue-green deployment?", available on Jun. 2019, retrieved on Jun. 2021, retrieved from URL<https://www.redhat.com/ja/topics/devops/what-is-blue-green-deployment>, 15 pages (with machine translation).

\* cited by examiner

Fig. 11

UPDATE CONTROL METHOD OF CONTAINER INFRASTRUCTURE CLUSTER, UPDATE SYSTEM OF CONTAINER INFRASTRUCTURE CLUSTER, UPDATE CONTROL DEVICE, AND UPDATE CONTROL PROGRAM

CROSS-REFERENCE TO RELATED APPLICATIONS

This application is a National Stage application under 35 U.S.C. § 371 of International Application No. PCT/JP2021/024331, having an International Filing Date of Jun. 28, 2021, the disclosure of which is considered part of the disclosure of this application, and is incorporated by reference in its entirety into this application.

TECHNICAL FIELD

The present invention relates to a container-based cluster update control method using a virtualization technology, a container-based cluster, an update control device, and an update control program.

BACKGROUND ART

A container-based cluster including a worker node for executing a containerized application and a master node that manages the worker node has been proposed. As orchestration software for integrally managing the container-based cluster, Kubernetes has been widely used.

Conventionally, as a method of updating a container-based cluster including a master node and a worker node or an application on a container, a rolling update method and a blue-green method are used.

The rolling update method is a method of sequentially updating one by one while operating a system (refer to Non Patent Literature 1). The blue-green method is a method in which a container-based cluster is constructed as a new actual environment separately from an existing container-based cluster, and is updated by being switched by a load balancer (refer to Non Patent Literature 2).

CITATION LIST

Non Patent Literature

Non Patent Literature 1: "Performing a Rolling Update", [online], kubernetes, Jun. 5, 2020, [retrieved on Jun. 21, 2021], Internet <https://kubernetes.io/ja/docs/tutorials/kubernetes-basics/update/update-intro/>

Non Patent Literature 2: "What is blue green deployment?", [online], Red Hat, [retrieved on Jun. 21, 2021], Internet <https://www.redhat.com/ja/topics/devops/what-is-blue-green-deployment>

SUMMARY OF INVENTION

Technical Problem

However, when update of a container-based cluster is executed according to the rolling update method, it is not possible to return to a state before the update in a case where a problem occurs during the update. That is, there is an irreversible execution process in the rolling update method. For example, a master node managed by Kubernetes cannot return to an original version after the update is executed.

On the other hand, in the blue-green method, there is no irreversible process as described above, but twice the resources (a server and the like) during an operation are required during update work, and the cost at the time of the update work increases.

The present invention has been made in view of such circumstances, and an object of the present invention is to make it possible to return to a state before the occurrence of a problem even if a problem occurs during update in a container-based cluster, and to make it possible to execute update with less resources than the blue-green method.

Solution to Problem

According to the present invention, there is provided an update control method for a container-based cluster using a container-based cluster update system including a container-based cluster, an update control device that controls update of the container-based cluster, and a load balancer, in which the container-based cluster includes a plurality of worker nodes that cause a virtualized container to execute processing of an application and a master node that manages the worker nodes, one or more of the applications being made redundant in the plurality of worker nodes, and the redundant applications being installed in different worker nodes, the update control method including causing the update control device to execute; a master node construction step of constructing a new master node in a new container-based cluster different from the container-based cluster in an initial state before update; a worker node construction step of constructing, in the new container-based cluster, a minimum number of the worker nodes required for a migration target application to execute processing, the migration target application being selected from among the one or more applications installed in the plurality of worker nodes of the container-based cluster in the initial state and indicating an application that is a target to be sequentially migrated to the new container-based cluster; an application installation step of installing the migration target application in the minimum required number of the constructed worker nodes; a communication connection step of communicatively connecting the worker node in which the migration target application is installed and the load balancer; an application deletion step of deleting the migration target application from the container-based cluster in the initial state; a worker node deletion step of deleting a worker node in which the application is no longer installed due to the deletion of the migration target application from the container-based cluster in the initial state; and a worker node addition step of adding the number of worker nodes deleted from the container-based cluster in the initial state to the new container-based cluster, in which the update control device sequentially selects the migration target application in the container-based cluster in the initial state to install the migration target application in a worker node constructed in the new container-based cluster, repeats deletion of the migration target application from the container-based cluster in the initial state and deletion of a worker node in which the application is not installed to migrate all applications, and deletes the master node of the container-based cluster in the initial state to update the container-based cluster in the initial state to the new container-based cluster, and, in each of the steps, checks whether or not each of the steps has been executed normally by inquiring the master node of the container-based cluster in the initial state or the new container-based cluster, and in a case where there is a step that has not been executed normally, returns processing to immediately before the step, and executes the step again.

Advantageous Effects of Invention

According to the present invention, in the container-based cluster, even if a problem occurs during the update, it is possible to return to a state before the occurrence of the problem, and it is possible to execute the update with less resources than in the blue-green method.

BRIEF DESCRIPTION OF DRAWINGS

FIG. 11 is a diagram for describing [tenth step] of deleting the container compute unit and the container management unit of the container-based cluster in the initial state.

DESCRIPTION OF EMBODIMENTS

Next, a mode for carrying out the present invention (hereinafter, referred to as the "present embodiment") will be described.

Figure 1:
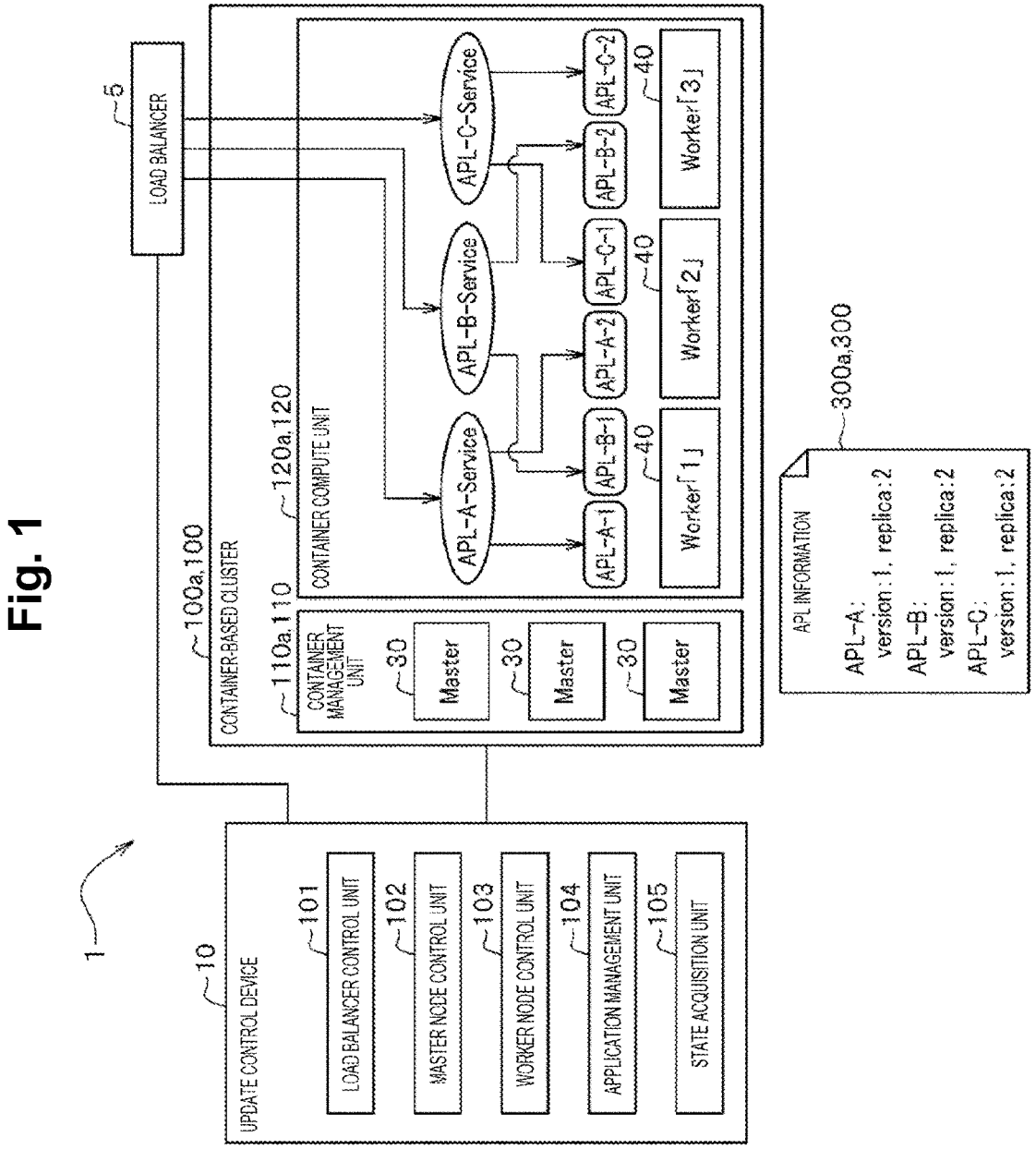
FIG. 1 is a diagram illustrating an overall configuration of a container-based cluster update system including an update control device according to the present embodiment.

FIG. 1 is a diagram illustrating an overall configuration of a container-based cluster update system 1 including an update control device 10 according to the present embodiment. FIG. 1 illustrates a configuration during a normal operation before update is performed (hereinafter, referred to as an "initial state").

As illustrated in FIG. 1, a container-based cluster 100 (100a) includes a worker node 40 (in each drawing, denoted by "Worker") in which a containerized application is provided and a master node 30 (in each drawing, denoted by "Master") that manages a plurality of worker nodes 40. The container-based cluster 100 before the update is executed (initial state) is denoted by the reference sign 100a, and functional units of the container-based cluster 100a have the reference sign "a" added thereto.

The container-based cluster 100 (100a) includes a container management unit 110 (110a) and a container compute unit 120 (120a). In the container compute unit 120 (120a), one or more worker nodes 40 are disposed, and a service is executed by a containerized application set on each worker node 40. In a case where Kubernetes is employed as orchestration software that manages the container-based cluster 100, the worker node 40 performs processing in units of Pod including one or more containers that operate an application (for example, APL-A that will be described later).

One or more master nodes 30 that manage (setting, state monitoring, and the like) each worker node 40 are disposed in the container management unit 110 (110a). A plurality of master nodes 30 (usually three in a commercial cluster) is provided for redundancy, but the number of master nodes is not limited to three as illustrated in FIG. 1, and one or more master nodes may be provided. The plurality of redundant master nodes 30 are subjected to a synchronization process by orchestration software (for example, Kubernetes).

The container-based cluster update system 1 according to the present embodiment includes the container-based cluster 100a before update execution (initial state), a load balancer 5 that allocates a processing request to applications, an update control device 10, and a new container-based cluster 100b (refer to FIGS. 2 to 11) constructed under the control of the update control device 10.

The container-based cluster update system 1 is characterized by updating the application with respect to the container-based cluster 100a according to the rolling update method over the container-based cluster 100 (100a, 100b) while employing the blue-green method.

Specifically, the update control device 10 constructs the container management unit 110 (110b) in the new container-based cluster 100b, and then constructs the container compute unit 120 (120b) including the minimum required number of worker nodes 40. The load balancer 5 completes the update by switching a communication path to the new container-based cluster 100b.

Hereinafter, functions and processes of the container-based cluster update system 1 will be described in detail. The functions of the container-based cluster 100 and the load balancer 5 are conventional technologies, and thus descriptions thereof will be omitted.

Update Control Device

The update control device 10 performs control for updating (upgrading) the container-based cluster 100a before update execution (initial state) and performing migration to the new container-based cluster 100b after update. The update control device 10 is communicatively connected to each master node 30 and each worker node 40 in the container-based cluster 100 (100a, 100b) or the load balancer 5.

The update control device 10 is implemented by a computer including a control unit, an input/output unit, and a storage unit (not illustrated) (refer to FIG. 12 that will be described later in detail).

The input/output unit inputs and outputs information to and from each master node 30 and each worker node 40 in the container-based cluster 100 (100*a*, 100*b*), the load balancer 5, other external devices, and the like. The input/output unit includes a communication interface that transmits and receives information via a communication line.

The storage unit stores information regarding each master node 30, each worker node 20, a containerized application, and the like, which is information regarding the container-based cluster 100 (100*a*, 100*b*).

As illustrated in FIG. 1, the control unit of the update control device 10 includes a load balancer control unit 101, a master node control unit 102, a worker node control unit 103, an application management unit 104, and a state acquisition unit 105.

Figure 5:
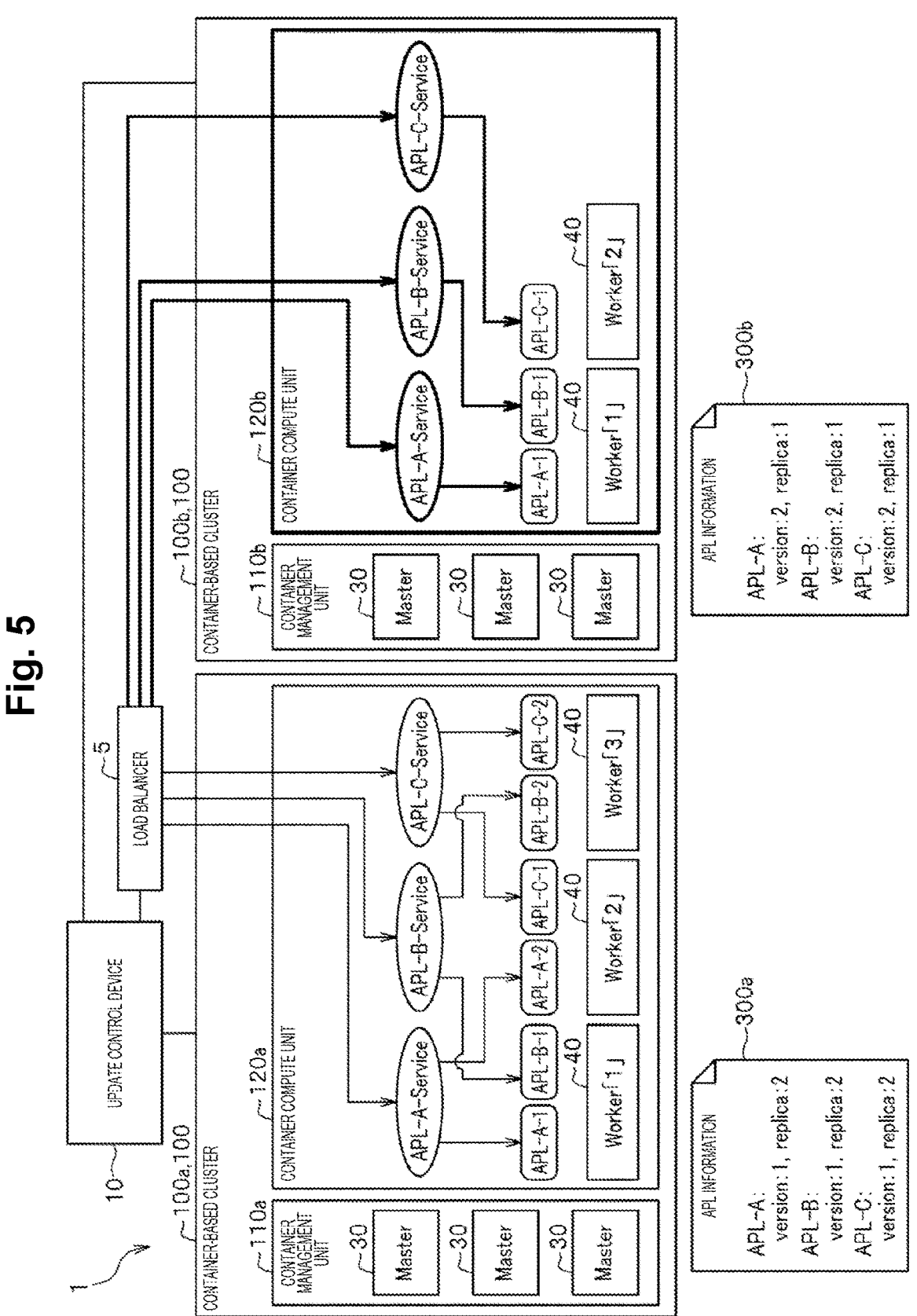
FIG. 5 is a diagram for describing a [fourth step] of setting communication of the application constructed in the container compute unit of the new container-based cluster.

The load balancer control unit 101 instructs the load balancer 5 to set communication for the application set in the worker node 40 of the constructed new container-based cluster 100*b* and to check that setting of a communication path has been appropriately performed (refer to FIG. 5).

Figure 10:
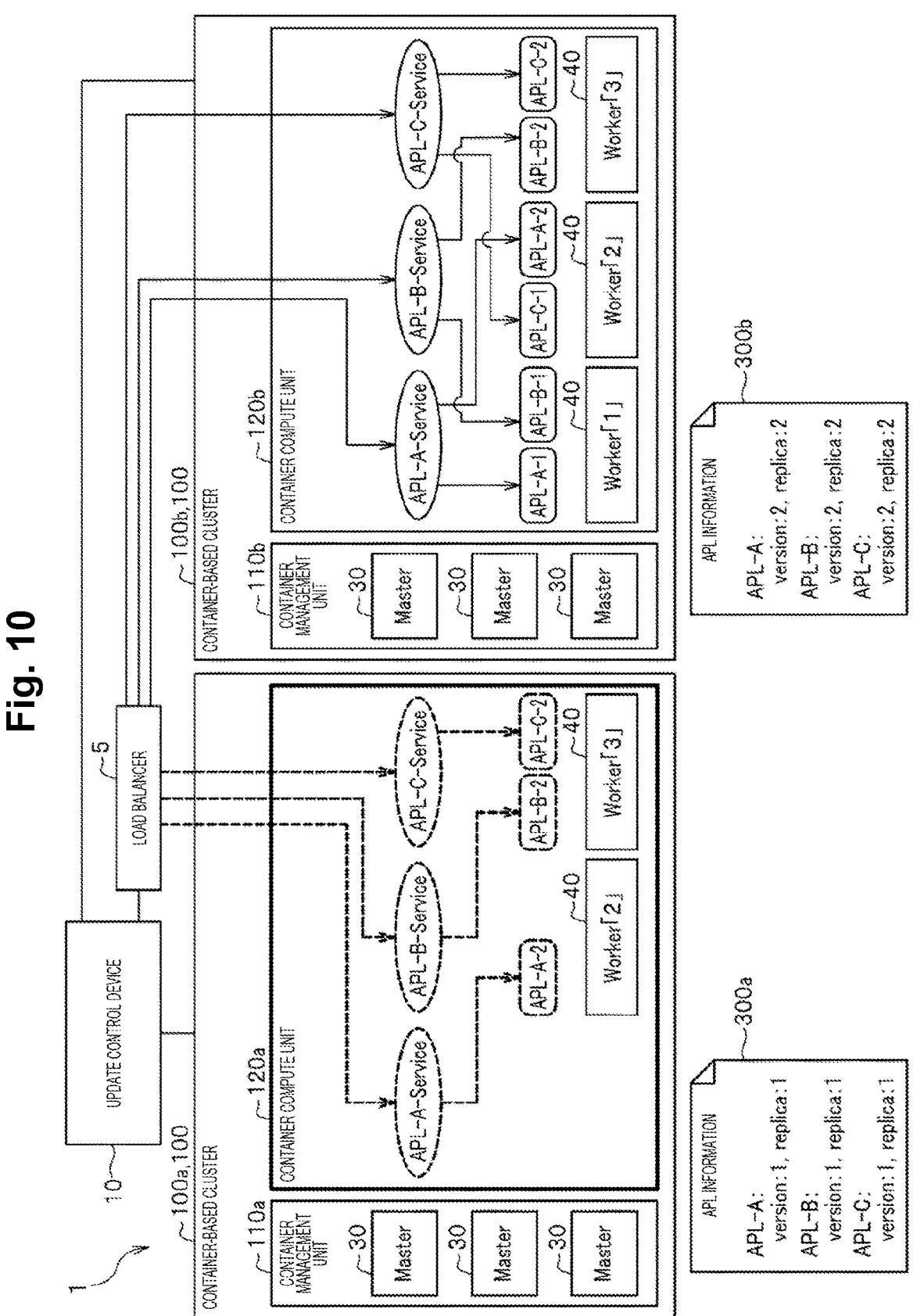
FIG. 10 is a diagram for describing a [ninth step] of deleting an application and deleting a communication path provided in the container compute unit of the container-based cluster in the initial state.

In a case where setting of an application is performed normally in the constructed new container-based cluster 100*b*, the load balancer control unit 101 deletes set communication with the application of the container-based cluster 100*a* (refer to FIG. 10).

Figure 2:
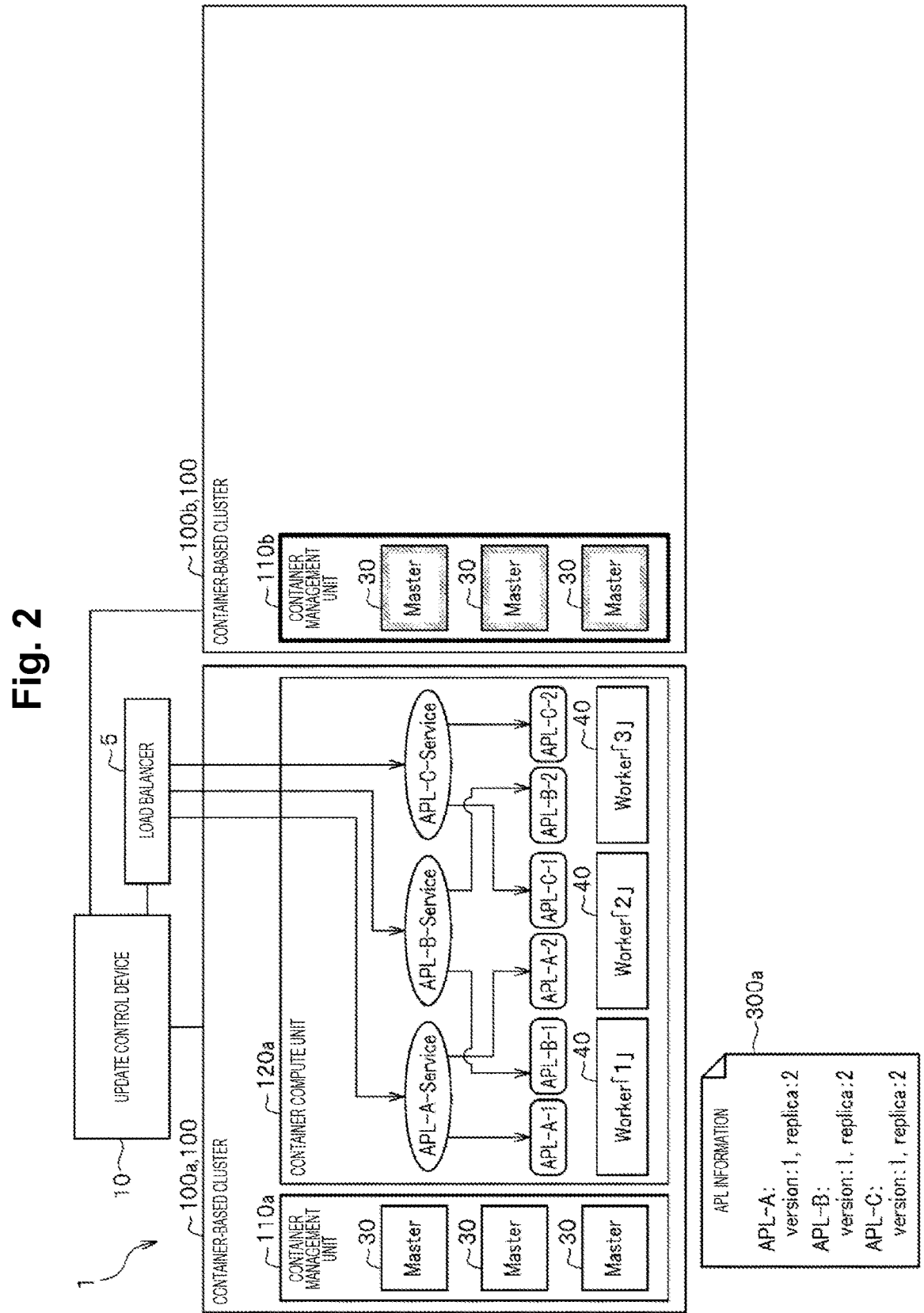
FIG. 2 is a diagram for describing a [first step] of constructing a container management unit of a new container-based cluster.

The master node control unit 102 constructs a container management unit 110*b* of the constructed new container-based cluster 100*b* (refer to FIG. 2). Specifically, the master node control unit 102 constructs one or more master nodes 30 in the container-based cluster 100*b* as the container management unit 110*b*.

Figure 7:
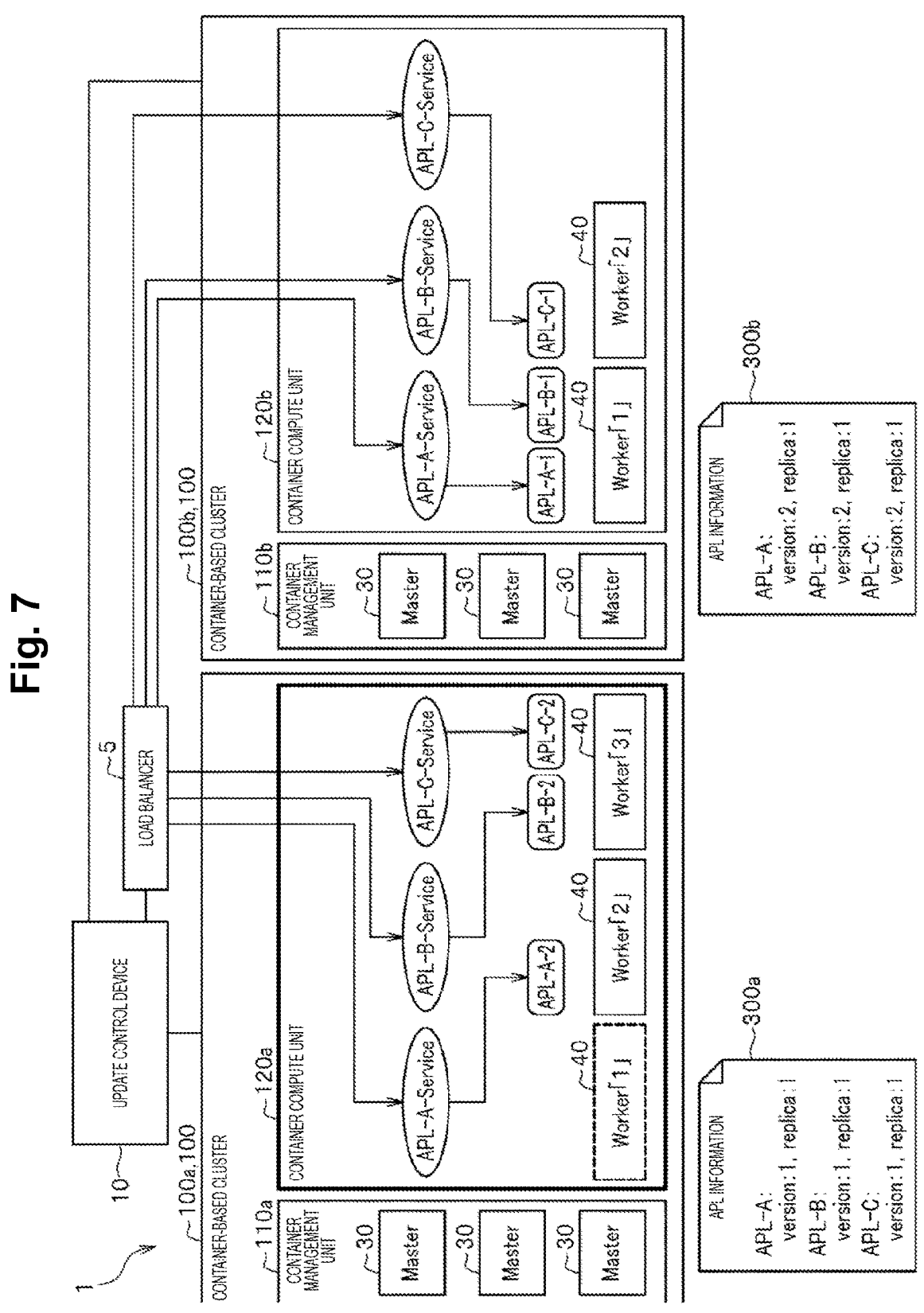
FIG. 7 is a diagram for describing a [sixth step] of reducing the number of worker nodes provided in the container compute unit of the container-based cluster in the initial state.
Figure 11:
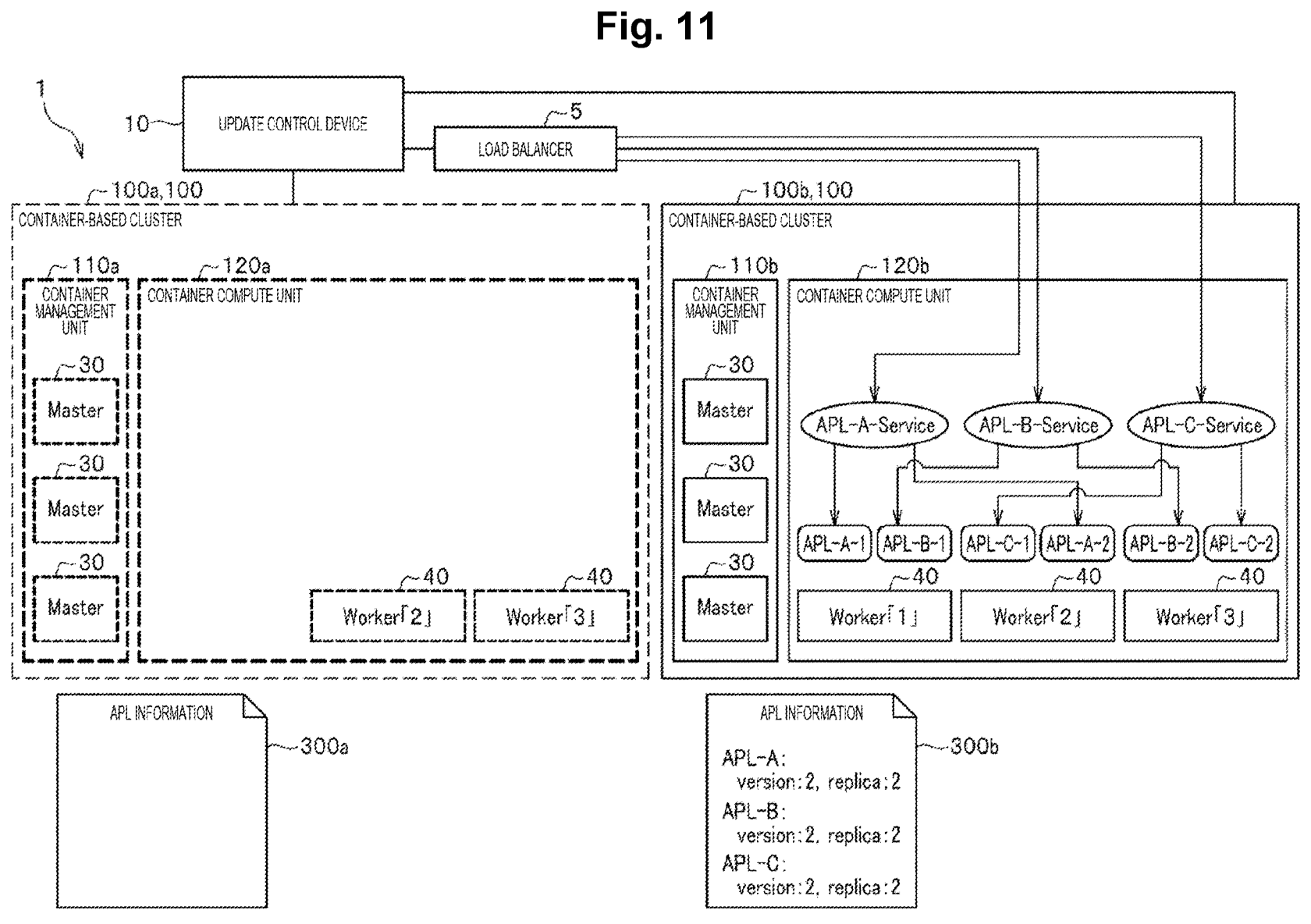

In a case where migration to the container-based cluster 100*b* has been completed normally, the master node control unit 102 deletes the container management unit 110*a* of the container-based cluster 100*a*, specifically, each constructed master node 30 (refer to FIGS. 7 and 11).

Figure 3:
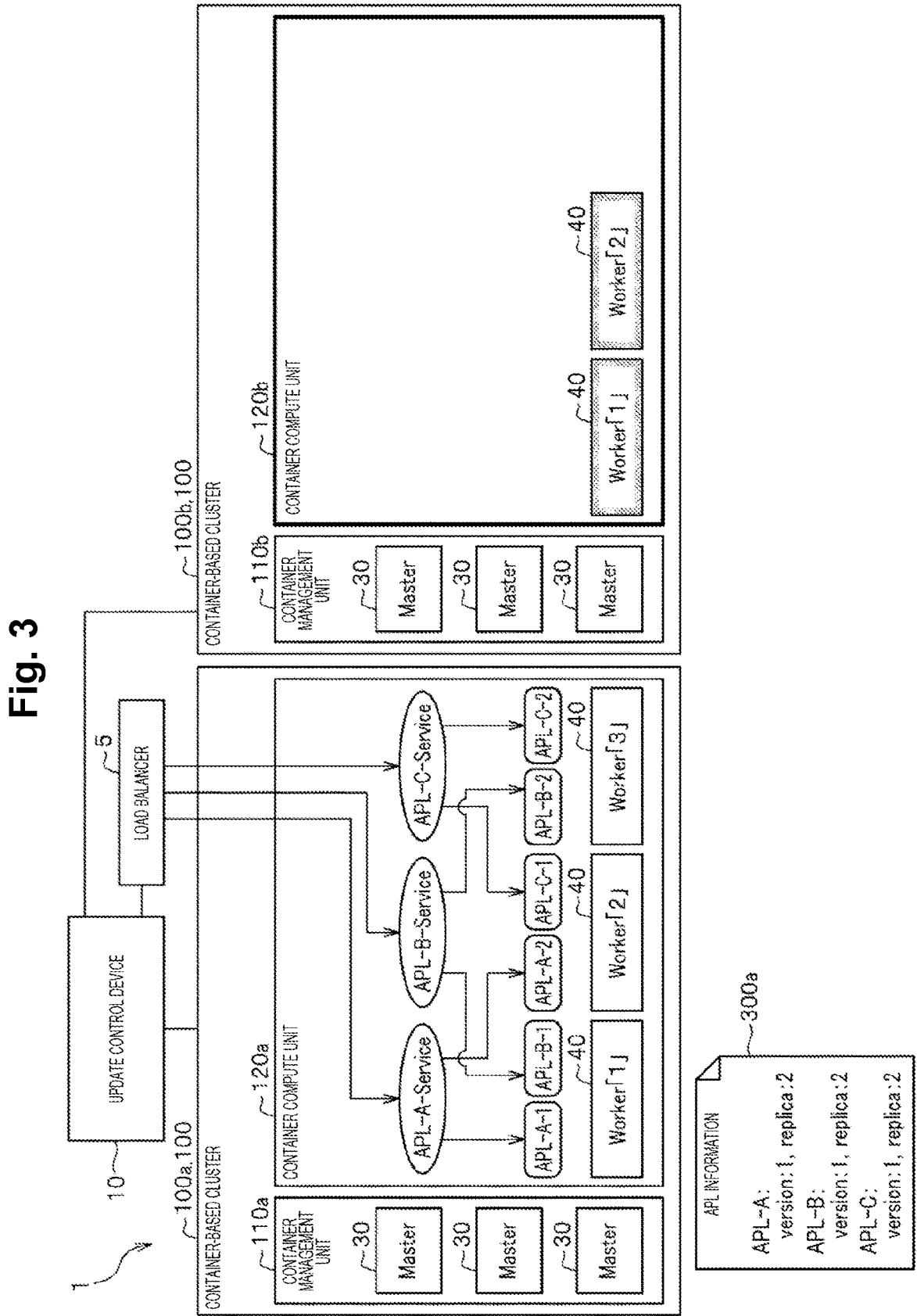
FIG. 3 is a diagram for describing a [second step] of constructing a container compute unit of the new container-based cluster.

The worker node control unit 103 constructs a container compute unit 120*b* in the new container-based cluster 100*b* (refer to FIG. 3). Specifically, the worker node control unit 103 constructs the minimum required number of worker nodes 40 in the container-based cluster 100*b* as the container compute unit 120*b*.

As the minimum required number of worker nodes 40, the worker node control unit 103 constructs the number of applications (here, APL-A, APL-B, and APL-C) that can be added one by one. That is, the worker node control unit 103 constructs, in the new container-based cluster 100*b*, the minimum number of worker nodes 40 required for a migration target application to execute processing, the application (migration target application) to be sequentially migrated to the new container-based cluster 100*b* being selected from among one or more applications installed in a plurality of worker nodes of the container-based cluster 100*a* in an initial state.

In the present embodiment, it is assumed that two worker nodes 40 are necessary to operate three applications (APL-A, APL-B, and APL-C) as selected migration target applications. The minimum required number may be set in advance according to a processing load of each application and stored in, for example, a storage unit (not illustrated) of the update control device 10. Alternatively, the worker node control unit 103 may first add one worker node, and if the worker node cannot be set normally, may further add one worker node at a time to check that the worker node can be set normally.

When the setting of addition of each application is performed normally in the new container-based cluster 100*b*, the worker node control unit 103 selects and deletes the worker node 40 in which no application is installed in the container-based cluster 100*a* (refer to FIG. 7).

In a case where there is no worker node 40 in which no application is installed, the worker node control unit 103 moves an application to another worker node 40 under the control of the application management unit 104, and thus generates the worker node 40 in which no application is installed and deletes the worker node 40.

Here, in a case where Kubernetes is employed as orchestration software that manages the container-based cluster 100, the application management unit 104 may instruct the master node 30 to move an application to another worker node 40 by using, for example, "kubectl drain <NODE name>" that is a Pod evacuation command from a server.

Figure 4:
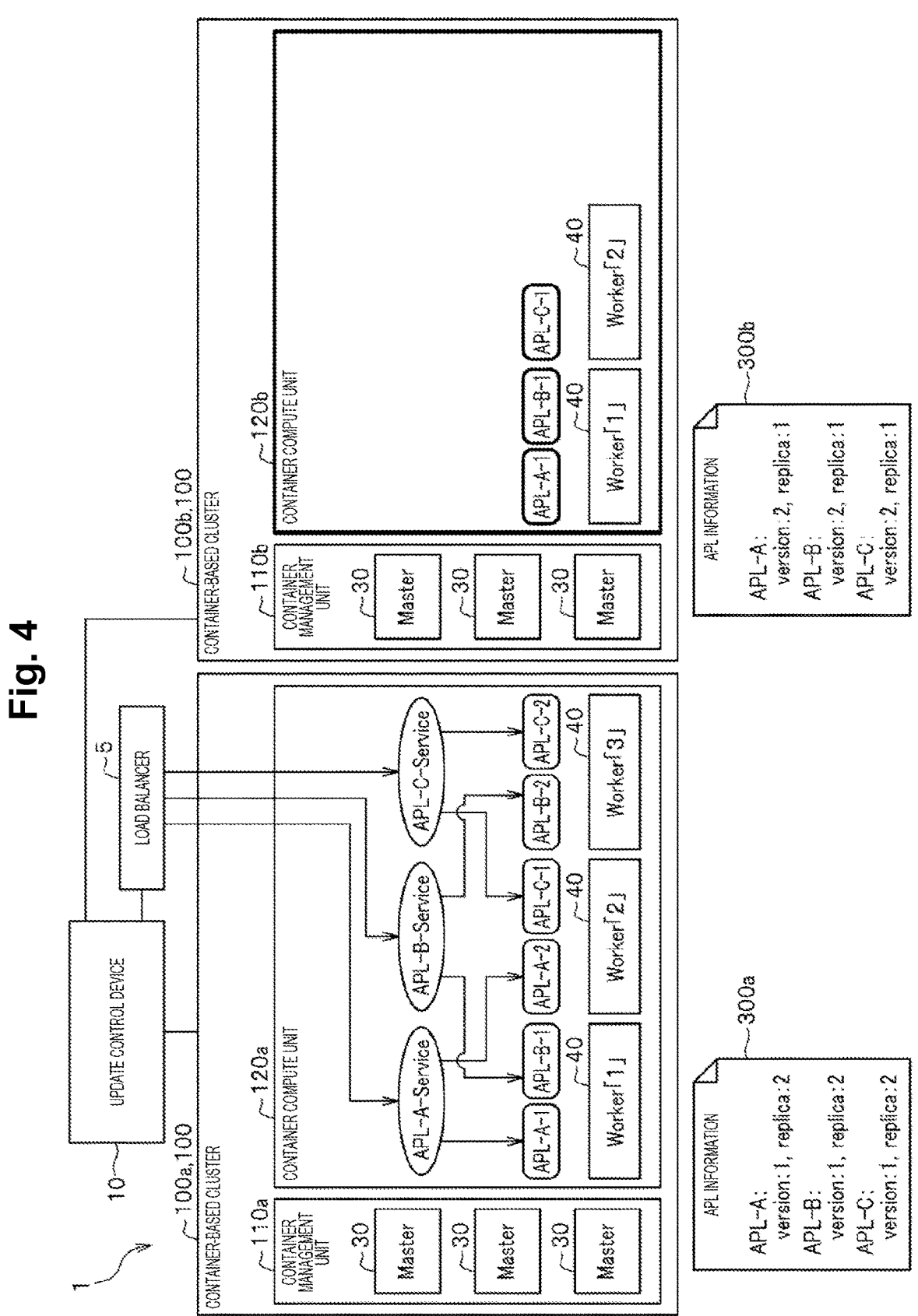
FIG. 4 is a diagram for describing a [third step] of constructing an application in the container compute unit of the new container-based cluster.
Figure 9:
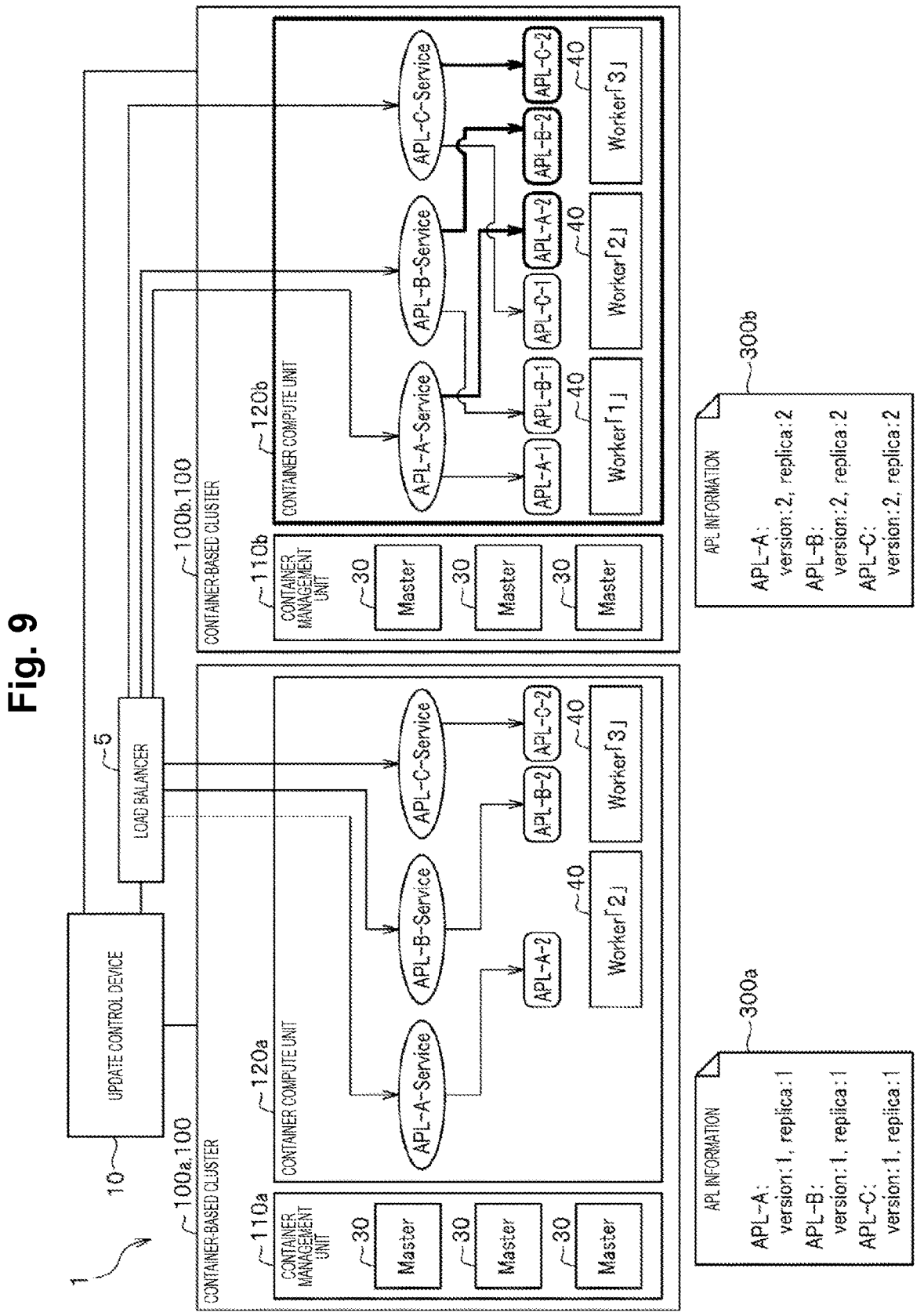
FIG. 9 is a diagram for describing an [eighth step] of adding an application to the container compute unit of the new container-based cluster.

In a case where the worker node 40 is constructed in the constructed new container-based cluster 100*b*, the application management unit 104 sets a containerized application (migration target application) on the worker node 40 (refer to FIGS. 4 and 9).

Figure 6:
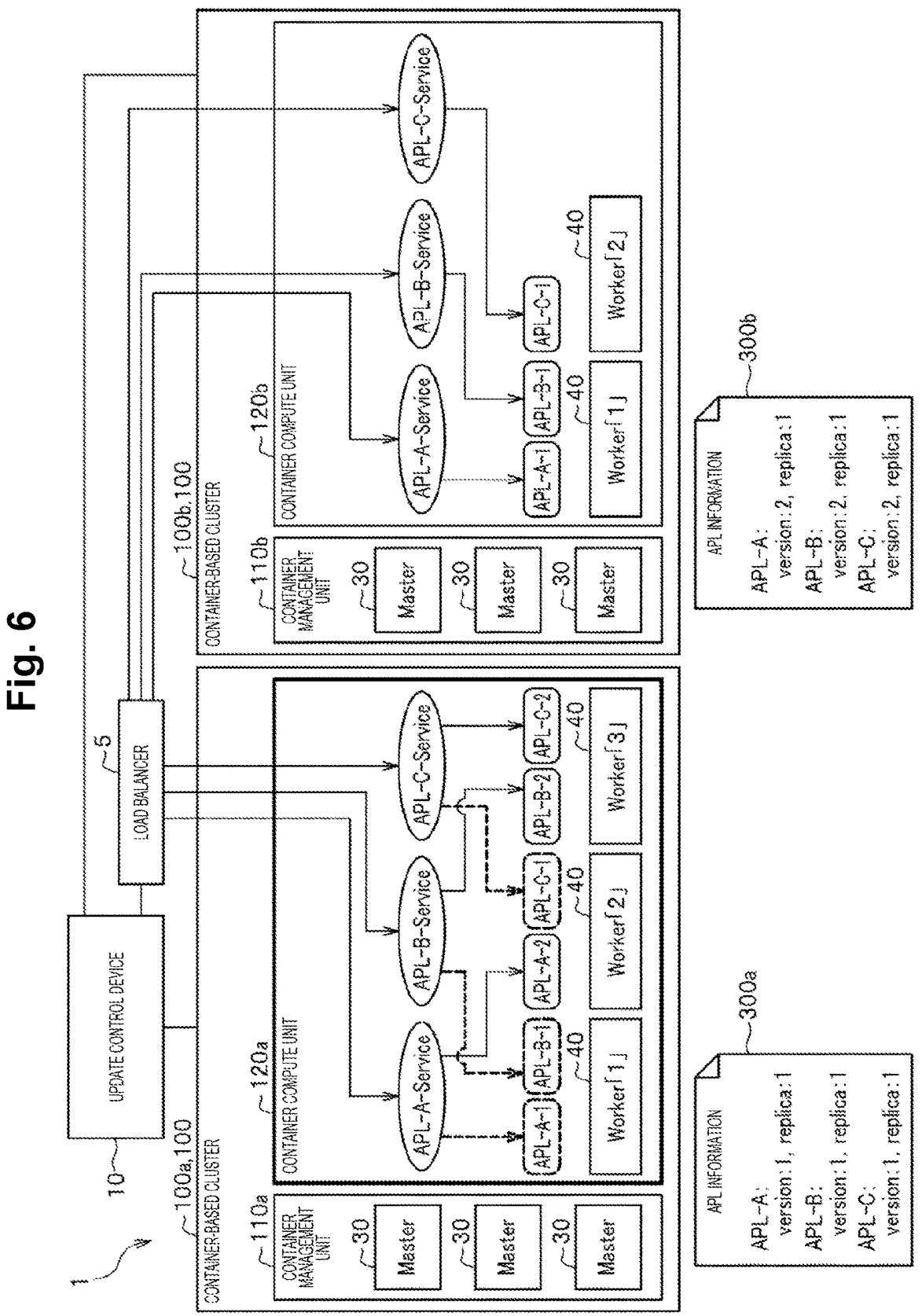
FIG. 6 is a diagram for describing a [fifth step] of reducing the number of replicas of an application provided in a container compute unit of the container-based cluster in an initial state.

In a case where setting of a new application has been completed normally in the container-based cluster 100*b*, the application management unit 104 deletes a corresponding application (migration target application) in the container-based cluster 100*a* (refer to FIGS. 6 and 10).

The state acquisition unit 105 checks that each process of the load balancer control unit 101, the master node control unit 102, the worker node control unit 103, and the application management unit 104 has been performed normally by inquiring the master nodes 30 of the container-based clusters 100*a* and 100*b*. In a case where it is checked that the process has not been performed normally, the state acquisition unit 105 notifies a functional unit that has performed the process to return to the state before the process, and instructs to execute the process again.

In a case where Kubernetes is employed as orchestration software that manages the container-based cluster 100, the state acquisition unit 105 can check the normality of each worker node 40 by giving an instruction to the master node 30 by using, for example, "kubectl get nodes" which is a normality check command for each worker node 40.

Update Control Process

Next, an update control process for the container-based cluster 100 performed by the container-based cluster update system 1 according to the present embodiment will be described with reference to FIGS. 1 to 11.

It is assumed that the container-based cluster 100 is in an actual operation state (initial state) as illustrated in FIG. 1. As illustrated in FIG. 1, it is assumed that one or more master nodes 30 (here, three master nodes 30) are disposed in the container-based cluster 100*a*. It is assumed that one or more applications (here, three applications such as APL-A, APL-B, and APL-C) are installed and operated as applications for realizing services in the plurality of worker nodes 40 (here, three worker nodes 40). Each application is made redundant to maintain the availability of the service even in the actual operation state, and two applications each operate on the container, such as APL-A-1, APL-A-2, APL-B-1, APL-B-2, APL-C-1, and APL-C-2.

Here, application information (referred to as "APL information 300") set in the container compute unit 120*a* is "version: 1, replica: 2" for each application (APL-A, APL-B, and APL-C) as indicated by the APL information 300*a* in FIG. 1. That is, this indicates that a version of each application is "1", and each application operates in two (redundant).

Hereinafter, an update control process of the container-based cluster update system 1 will be described. This update control process is started, for example, when the update control device 10 receives an update start instruction for the container-based cluster 100*a* from an external apparatus (not illustrated) that manages the container-based cluster update system 1.

[First Step]

FIG. 2 is a diagram for describing a [first step] of constructing the container management unit 110*b* of the new container-based cluster 100*b*. The [first step] corresponds to a master node construction step described in the claims.

For example, when the update control device 10 receives an update start instruction, the master node control unit 102 (FIG. 1) constructs the container management unit 110*b* of the constructed new container-based cluster 100*b* as the [first step]. Specifically, the master node control unit 102 constructs three master nodes 30 in the container-based cluster 100*b* as the container management unit 110*b* as illustrated in FIG. 2, similarly to the container management unit 110*a* of the container-based cluster 100*a*.

The state acquisition unit 105 (FIG. 1) of the update control device 10 checks whether or not each master node 30 of the container management unit 110*b* of the container-based cluster 100*b* is constructed normally by inquiring the master node 30 of the container management unit 110*b*. The state acquisition unit 105 notifies the master node control unit 102 of a check result. Here, in a case where a notification indicating that the construction has not been performed normally is received, the master node control unit 102 returns the process to immediately before the [first step] and executes the [first step] again.

[Second Step]

FIG. 3 is a diagram for describing a [second step] of constructing the container compute unit 120*b* of the new container-based cluster 100*b*. The [second step] corresponds to a worker node construction step described in the claims.

As the [second step], the worker node control unit 103 (FIG. 1) of the update control device 10 constructs the container compute unit 120*b* of the container-based cluster 100*b* as illustrated in FIG. 3. Specifically, the worker node control unit 103 constructs, as the container compute unit 120*b*, the minimum number of worker nodes 40 required for a migration target application to execute processing, the migration target application being selected from among one or more applications installed in the plurality of worker nodes 40 of the container-based cluster 100*a* in an initial state.

In the present embodiment, it is assumed that two worker nodes 40 are required at a minimum as described above in order to operate three applications (APL-A, APL-B, and APL-C). Therefore, the worker node control unit 103 constructs two worker nodes 40 (here, Workers "1" and "2").

The state acquisition unit 105 (FIG. 1) of the update control device 10 checks whether or not each worker node 40 (here, two Workers "1" and "2") of the container compute unit 120*b* of the container-based cluster 100*b* has been constructed normally by inquiring the master node 30 of the container management unit 110*b*. The state acquisition unit 105 notifies the worker node control unit 103 of the check result. Here, in a case where a notification indicating that the construction has not been performed normally is received, the worker node control unit 103 returns the process to immediately before the [second step] and executes the [second step] again.

[Third Step]

FIG. 4 is a diagram for describing a [third step] of constructing an application in the container compute unit 120*b* of the new container-based cluster 100*b*. The [third step] corresponds to an application installation step described in the claims.

As the [third step], the application management unit 104 (FIG. 1) of the update control device 10 constructs applications (APL-A, APL-B, and APL-C) that are migration target applications in the container compute unit 120*b* of the container-based cluster 100*b* as illustrated in FIG. 4.

Here, APL-A-1, APL-B-1, and APL-C-1 are constructed under the control of the application management unit 104. As indicated by the version "2" of the APL information 300*b* in FIG. 4, these applications show an example in which the version is higher than that of the applications of the container-based cluster 100*a* in the initial state.

In the present embodiment, an example in which the container-based cluster 100 itself and the applications are simultaneously updated will be described. However, only the container-based cluster 100 may be updated without upgrading the version of the applications.

The state acquisition unit 105 (FIG. 1) of the update control device 10 checks whether or not each application (APL-A-1, APL-B-1, and APL-C-1) has been constructed normally in the container compute unit 120*b* of the container-based cluster 100*b* by inquiring the master node 30 of the container management unit 110*b*. The state acquisition unit 105 notifies the application management unit 104 of the check result. Here, in a case where a notification indicating that the application has not been constructed normally is received, the application management unit 104 returns the process to immediately before the [third step] and executes the [third step] again.

[Fourth Step]

FIG. 5 is a diagram for describing a [fourth step] of setting communication of the application constructed in the container compute unit 120*b* of the new container-based cluster 100*b*. The [fourth step] corresponds to a communication connection step described in the claims.

As the [fourth step], as illustrated in FIG. 5, the load balancer control unit 101 (FIG. 1) and the application management unit 104 (FIG. 1) of the update control device 10 set a communication path such that communication can be performed between the load balancer 5 and each application (APL-A-1, APL-B-1, and APL-C-1) constructed in the container-based cluster 100*b*.

After setting the communication path, the state acquisition unit 105 (FIG. 1) of the update control device 10 checks whether or not the communication path of each application (APL-A-1, APL-B-1, and APL-C-1) has been constructed normally by inquiring the master node 30 of the container management unit 110*b*. The state acquisition unit 105 checks a state of the load balancer 5, and checks that communication with each application (APL-A-1, APL-B-1, and APL-C-1) of the container-based cluster 100*b* is set normally.

The state acquisition unit 105 notifies the application management unit 104 and the load balancer control unit 101 of the check result. Here, in a case where a notification indicating that the setting has not been performed normally is received, the application management unit 104 and the load balancer control unit 101 return the process to immediately before [fourth step] and execute [fourth step] again.

[Fifth Step]

FIG. 6 is a diagram for describing a [fifth step] of reducing the number of replicas of the application (APL-A, APL-B, and APL-C) provided in the container compute unit 120*a* of the container-based cluster 100*a* in the initial state. The [fifth step] corresponds to an application deletion step described in the claims.

As the [fifth step], the application management unit 104 (FIG. 1) of the update control device 10 reduces the number of replicas of an application (APL-A, APL-B, and APL-C) that is a migration target application of the container compute unit 120*a* of the container-based cluster 100*a*. Here, as illustrated in FIG. 6, the application management unit 104 deletes each application (APL-A-1, APL-B-1, and APL-C-1). Consequently, as illustrated in FIG. 6, the number of replicas of each application becomes "one" in the APL information 300*a* of the container-based cluster 100*a* in the initial state.

The state acquisition unit 105 (FIG. 1) of the update control device 10 checks whether each application (APL-A-1, APL-B-1, and APL-C-1) has been deleted normally by inquiring the master node 30 of the container management unit 110*a*. The state acquisition unit 105 notifies the application management unit 104 of the check result. Here, in a case where a notification indicating that deletion has not been performed normally is received, the application management unit 104 returns the process to immediately before the [fifth step] and executes the [fifth step] again.

[Sixth Step]

FIG. 7 is a diagram for describing a [sixth step] of reducing the number of worker nodes 40 provided in the container compute unit 120*a* of the container-based cluster 100*a* in the initial state. The [sixth step] corresponds to a worker node deletion step described in the claims.

As the [sixth step], as illustrated in FIG. 7, the worker node control unit 103 (FIG. 1) of the update control device 10 checks each worker node 40 of the container compute unit 120*a* of the container-based cluster 100*a*, and deletes the worker node 40 in which no application is installed. In FIG. 7, the deleted worker node 40 (Worker "1") is indicated by a dashed line.

In a case where there is no worker node 40 in which no application is installed, the worker node control unit 103 notifies the application management unit 104 of the fact. Under the control of the application management unit 104, any one of the applications is moved to another worker node 40 to generate the worker node 40 in which no application is installed. The worker node control unit 103 deletes the worker node 40.

The state acquisition unit 105 (FIG. 1) of the update control device 10 checks whether or not the worker node 40 (Worker "1") in which no application is installed has been deleted normally by inquiring the master node 30 of the container management unit 110*a*. The state acquisition unit 105 notifies the worker node control unit 103 of the check result. Here, in a case where a notification indicating that deletion has not been performed normally is received, the worker node control unit 103 returns the process to immediately before [sixth step] and executes [sixth step] again.

[Seventh Step]

Figure 8:
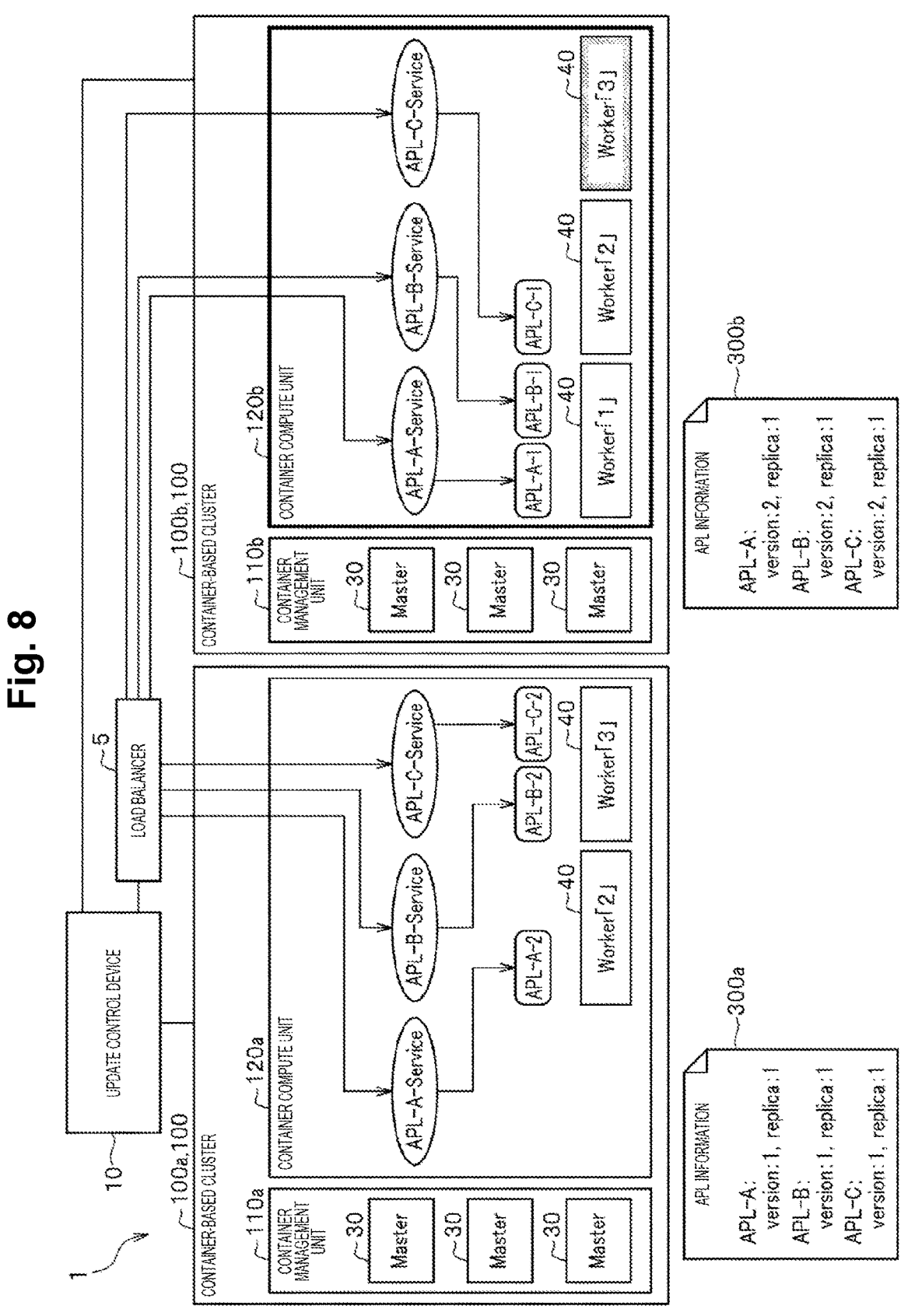
FIG. 8 is a diagram for describing a [seventh step] of adding a worker node to the container compute unit of the new container-based cluster.

FIG. 8 is a diagram for describing [seventh step] of adding the worker node 40 to the container compute unit 120*b* of the new container-based cluster 100*b*. The [seventh step] corresponds to a worker node addition step described in the claims.

As the [seventh step], as illustrated in FIG. 8, the worker node control unit 103 (FIG. 1) of the update control device

10 adds a new worker node 40 in the container compute unit 120*b* of the container-based cluster 100*b*. The number of new worker nodes 40 to be added is the same as the number of worker nodes deleted in the [sixth step]. FIG. 8 illustrates an example in which one worker node 40 (Worker "3") is constructed by the worker node control unit 103.

The state acquisition unit 105 (FIG. 1) of the update control device 10 checks whether or not the worker node 40 (here, one Worker "3") has been constructed normally in the container compute unit 120*b* of the container-based cluster 100*b* by inquiring the master node 30 of the container management unit 110*b*.

The state acquisition unit 105 notifies the worker node control unit 103 of the check result. Here, in a case where a notification indicating that the construction has not been performed normally is received, the worker node control unit 103 returns the process to immediately before [seventh step] and executes [seventh step] again.

[Eighth Step]

FIG. 9 is a diagram for describing an [eighth step] of adding an application to the container compute unit 120*b* of the new container-based cluster 100*b*.

As the [eighth step], as illustrated in FIG. 9, the application management unit 104 (FIG. 1) of the update control device 10 adds applications (APL-A, APL-B, and APL-C) to the container compute unit 120*b* of the container-based cluster 100*b* as the next selected migration target applications.

Here, APL-A-2, APL-B-2, and APL-C-2 are added under the control of the application management unit 104. Due to the addition of the applications, as indicated by the APL information 300*b* in FIG. 9, the number of replicas of each application (APL-A, APL-B, and APL-C) of the version "2" becomes "two".

The state acquisition unit 105 (FIG. 1) of the update control device 10 checks whether or not each application (APL-A-2, APL-B-2, APL-C-2) has been added normally to the container compute unit 120*b* of the container-based cluster 100*b* by inquiring the master node 30 of the container management unit 110*b*. The state acquisition unit 105 notifies the application management unit 104 of the check result. Here, in a case where a notification indicating that the application has not been constructed normally is received, the application management unit 104 returns the process to immediately before [eighth step] and executes [eighth step] again.

[Ninth Step]

FIG. 10 is a diagram for describing a [ninth step] of deleting applications (APL-A, APL-B, and APL-C) and deleting a communication path provided in the container compute unit 120*a* of the container-based cluster 100*a* in the initial state.

As the [ninth step], the load balancer control unit 101 (FIG. 1) of the update control device 10 deletes a communication path between the load balancer 5 and each application (APL-A-2, APL-B-2, APL-C-2) of the container-based cluster 100*a* as illustrated in FIG. 10. The application management unit 104 deletes each application (APL-A-2, APL-B-2, APL-C-2) in the container-based cluster 100*a*.

After deletion of the communication path and each application (APL-A-2, APL-B-2, APL-C-2), the state acquisition unit 105 (FIG. 1) of the update control device 10 checks a state of the load balancer 5 and checks that the communication path with each application (APL-A-2, APL-B-2, APL-C-2) of the container-based cluster 100*a* has been deleted normally. The state acquisition unit 105 checks whether each application (APL-A-2, APL-B-2, APL-C-2)

has been deleted normally by inquiring the master node 30 of the container management unit 110a.

The state acquisition unit 105 notifies the application management unit 104 and the load balancer control unit 101 of the check result. Here, in a case where a notification indicating that the communication path and each application (APL-A-2, APL-B-2, APL-C-2) have not been deleted normally is received, the application management unit 104 and the load balancer control unit 101 return the process to immediately before the [ninth step] and execute the [ninth step] again.

[Tenth Step]

FIG. 11 is a diagram for describing a [tenth step] of deleting the container compute unit 120a and the container management unit 110a of the container-based cluster 100a in the initial state.

As the [tenth step], as illustrated in FIG. 11, the worker node control unit 103 (FIG. 1) of the update control device 10 deletes each worker node 40 (here, Workers "2" and "3") of the container compute unit 120a of the container-based cluster 100a. The master node control unit 102 (FIG. 1) deletes each master node 30 of the container management unit 110a.

As described above, according to the container-based cluster update system 1 of the present embodiment, a total of six worker nodes 40 are required to execute update in the case of the conventional blue-green method, but update can be performed by the five worker nodes 40. Therefore, the number of servers required for update can be reduced compared with the blue-green method.

According to the container-based cluster update system 1 of the present embodiment, under the control of the update control device 10, in a case where the processing cannot be executed normally in any step in the update, it is possible to return to the previous step. Therefore, it is possible to reliably update the container-based cluster 100.

The present invention is not limited to the above-described embodiment, and many modifications can be made by those skilled in the art within the technical idea of the present invention.

In the present embodiment, with the application (APL-A, APL-B, and APL-C) installed in the container-based cluster 100a in an initial state as one set, first, APL-A-1, APL-B-1, and APL-C-1 (migration target applications) are added to the new container-based cluster 100b and deleted from the container-based cluster 100a in an initial state, and then APL-A-2, APL-B-2, and APL-C-2 (next migration target applications) are added or deleted, so that update is realized. However, the present invention is not limited to the processing by the set of applications, and an addition or deletion process may be performed with one application as a migration target application in the order of APL-A, APL-B, and APL-C, for example, in the order of APL-A-1, APL-B-1, APL-C-1, APL-A-2, APL-B-2, and APL-C-2. In this case, for example, when APL-C-1 is moved to the new container-based cluster 100b, for example, a process of moving APL-A-2 that is another application in the original worker node 40 in which APL-C-1 is installed to another worker node 40 to generate a worker node 40 in which no application is installed is required. However, if the applications are processed one by one, the minimum required number of work nodes can be reduced to one. Therefore, the number of servers required at the time of update can be further reduced.

Hardware Configuration of Update Control Device

Figure 12:
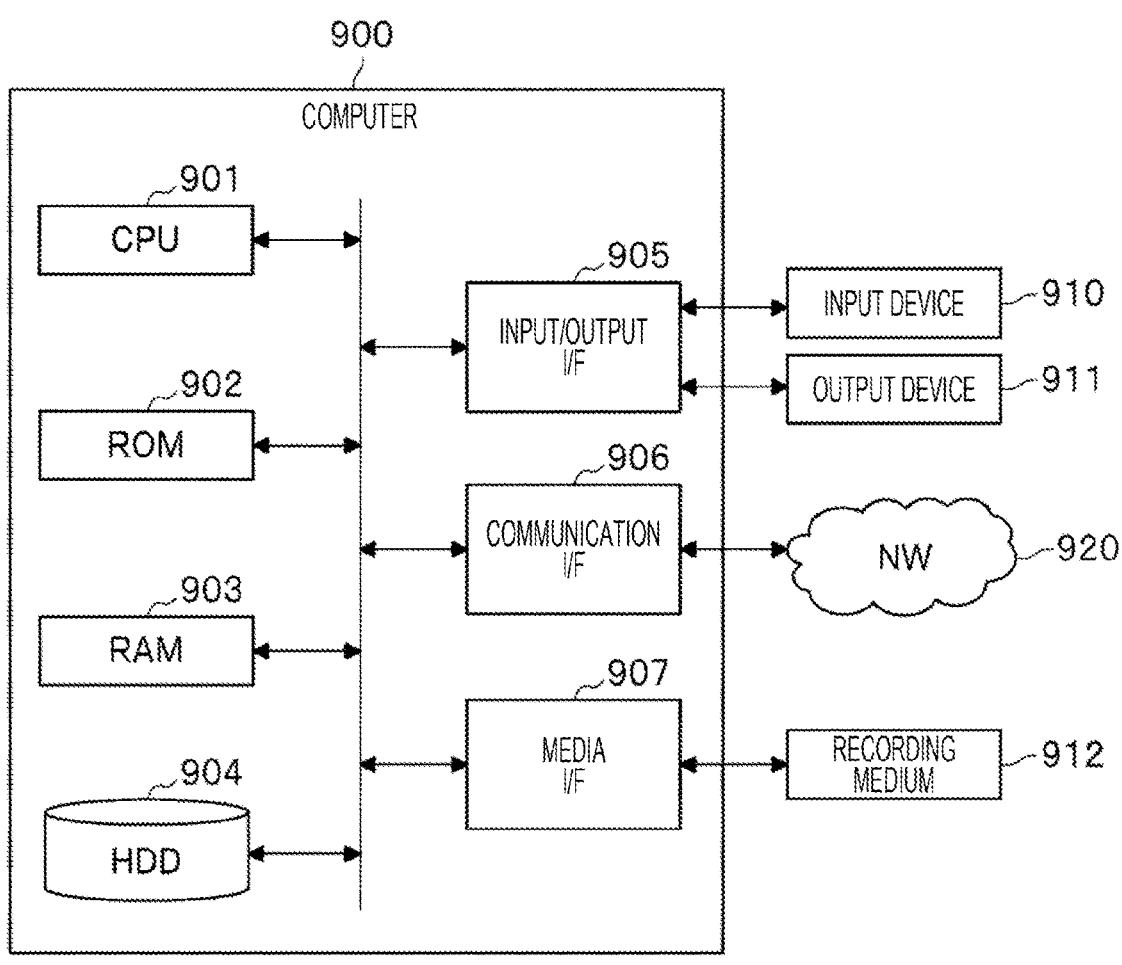
FIG. 12 is a hardware configuration diagram illustrating an example of a computer that realizes functions of the update control device according to the present embodiment.

The update control device 10 according to the present embodiment is implemented by, for example, a computer 900 having a configuration as illustrated in FIG. 12.

FIG. 12 is a hardware configuration diagram illustrating an example of the computer 900 that realizes the functions of the update control device 10 according to the present embodiment. The computer 900 includes a central processing unit (CPU) 901, a read only memory (ROM) 902, a RAM 903, a hard disk drive (HDD) 904, an input/output interface (I/F) 905, a communication I/F 906, and a media I/F 907.

The CPU 901 operates on the basis of a program (update control program) stored in the ROM 902 or the HDD 904, and performs control based on control units (the load balancer control unit 101, the master node control unit 102, the worker node control unit 103, the application management unit 104, and the state acquisition unit 105). The ROM 902 stores a boot program to be executed by the CPU 901 when the computer 900 is started, a program related to hardware of the computer 900, and the like.

The CPU 901 controls an input device 910 such as a mouse or a keyboard and an output device 911 such as a display or a printer via the input/output I/F 905. The CPU 901 acquires data from the input device 910 and outputs generated data to the output device 911 via the input/output I/F 905. A graphics processing unit (GPU) or the like may be used as a processor together with the CPU 901.

The HDD 904 stores a program to be executed by the CPU 901, data to be used by the program, and the like. The communication I/F 906 receives data from another device via a communication network (for example, a network (NW) 920), outputs the data to the CPU 901, and transmits data generated by the CPU 901 to another device via a communication network.

The media I/F 907 reads a program (update control program) or data stored in a recording medium 912, and outputs the read program or data to the CPU 901 via the RAM 903. The CPU 901 loads a program related to a target process from the recording medium 912 onto the RAM 903 via the media I/F 907, and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a semiconductor memory, or the like.

For example, in a case where the computer 900 functions as the update control device 10 of the present invention, the CPU 901 of the computer 900 realizes each function of the update control device 10 by executing a program loaded on the RAM 903. Data in the RAM 903 is stored in the HDD 904. The CPU 901 reads a program related to a target process from the recording medium 912, and executes the program. Additionally, the CPU 901 may read the program related to the target process from another device via the communication network (NW 920).

Advantageous Effects

Hereinafter, effects of the update control method for the container-based cluster according to the present invention will be described.

The update control method for the container-based cluster according to the present invention is a method of controlling update of the container-based cluster 100 by the container-based cluster update system 1 including the container-based cluster 100, the update control device 10 that controls update of the container-based cluster 100, and the load balancer 5, in which the container-based cluster 100 includes a plurality of worker nodes 40 that cause a virtualized container to executes processing of an application and the master node 30 that manages the worker nodes 40, one or more applications being made redundant in the plurality of worker nodes 40, and the redundant applications being installed in different worker nodes 40, the update control method including causing the update control device 10 to execute a master node construction step of constructing the new master node 30 in the new container-based cluster 100b different from the container-based cluster 100a in an initial state before update; a worker node construction step of constructing, in the new container-based cluster 100b, a minimum number of worker nodes 40 required for a migration target application to execute processing, the migration target application being selected from among the one or more applications installed in the plurality of worker nodes 40 of the container-based cluster 100a in the initial state and indicating an application that is a target to be sequentially migrated to the new container-based cluster 100b; an application installation step of installing the migration target application in the minimum required number of the constructed worker nodes 40; a communication connection step of communicatively connecting the worker node 40 in which the migration target application is installed and the load balancer 5; an application deletion step of deleting the migration target application from the container-based cluster 100a in the initial state; a worker node deletion step of deleting a worker node 40 in which the application is no longer installed due to the deletion of the migration target application from the container-based cluster 100a in the initial state; and a worker node addition step of adding the number of worker nodes 40 deleted from the container-based cluster 100a in the initial state to the new container-based cluster 100b, in which the update control device sequentially selects the migration target application in the container-based cluster 100a in the initial state to install the migration target application in a worker node 40 constructed in the new container-based cluster 100b, repeats deletion of the migration target application from the container-based cluster 100a in the initial state and deletion of a worker node 40 in which the application is not installed to migrate all applications, and deletes the master node 30 of the container-based cluster 100a in the initial state to update the container-based cluster 100a in the initial state to the new container-based cluster 100b, and, in each of the steps, checks whether or not each of the steps has been executed normally by inquiring the master node 30 of the container-based cluster 100a in the initial state or the new container-based cluster 100b, and in a case where there is a step that has not been executed normally, returns processing to immediately before the step, and executes the step again.

As described above, according to the update control method for the container-based cluster 100 of the present invention, in the case of the conventional blue-green method, two times the number of worker nodes 40 are required to execute update, but update can be performed with a smaller number than that.

Under the control of the update control device 10, in a case where processing cannot be executed normally in any step in the update, it is possible to return to the previous step. Therefore, it is possible to reliably update the container-based cluster 100.

In the worker node deletion step, in a case where there is no worker node in which an application is no longer installed, the update control device 10 moves an application installed in any of worker nodes to another worker node and generates a worker node in which an application is no longer installed.

As described above, in the worker node deletion step ([sixth step]), even in a case where there is no worker node 40 in which an application is no longer installed, the update control device 10 can generate the worker node 40 in which an application is not installed by moving the application to another worker node 40. Therefore, it is possible to reliably update the container-based cluster 100.

REFERENCE SIGNS LIST

1 Container-based cluster update system
5 Load balancer
10 Update control device
30 Master node
40 Worker node
100, 100a, 100b Container-based cluster
101 Load balancer control unit
102 Master node control unit
103 Worker node control unit
104 Application management unit
105 State acquisition unit
110, 110a, 110b Container management unit
120, 120a, 120b Container compute unit
300, 300a, 300b APL Information

The invention claimed is:

1. An update control method for a container-based cluster using a container-based cluster update system including a container-based cluster, an update control device configured to control update of the container-based cluster, and a load balancer, in which the container-based cluster includes a plurality of worker nodes that cause a virtualized container to execute processing of an application and a master node configured to manage the worker nodes, one or more of the applications being made redundant in the plurality of worker nodes, and the redundant applications being installed in different worker nodes, the update control method comprising:

a master node construction step of constructing a new master node in a new container-based cluster different from the container-based cluster in an initial state before update;

a worker node construction step of constructing, in the new container-based cluster, a minimum number of the worker nodes required for a migration target application to execute processing, the migration target application being selected from among the one or more applications installed in the plurality of worker nodes of the container-based cluster in the initial state and indicating an application that is a target to be sequentially migrated to the new container-based cluster;

an application installation step of installing the migration target application in the minimum required number of the constructed worker nodes;

a communication connection step of communicatively connecting the worker node in which the migration target application is installed and the load balancer;

an application deletion step of deleting the migration target application from the container-based cluster in the initial state;

a worker node deletion step of deleting a worker node in which the application is no longer installed due to the deletion of the migration target application from the container-based cluster in the initial state; and a worker node addition step of adding the number of worker nodes deleted from the container-based cluster in the initial state to the new container-based cluster, wherein the update control device is configured to:

sequentially select the migration target application in the container-based cluster in the initial state to install the migration target application in a worker node constructed in the new container-based cluster, repeat deletion of the migration target application from the container-based cluster in the initial state and deletion of a worker node in which the application is not installed to migrate all applications, and delete the master node of the container-based cluster in the initial state to update the container-based cluster in the initial state to the new container-based cluster, and in each of the steps, check whether or not each of the steps has been executed normally by inquiring the master node of the container-based cluster in the initial state or the new container-based cluster, and in a case where there is a step that has not been executed normally, return processing to immediately before the step, and execute the step again.

2. The update control method for a container-based cluster according to claim 1, wherein in the worker node deletion step, in a case where there is no worker node in which the application is no longer installed, the update control device is configured to move an application installed in one of the worker nodes to another worker node and generate a worker node in which the application is no longer installed.

3. A container-based cluster update system comprising:

a container-based cluster;

an update control device configured to control update of the container-based cluster; and a load balancer, wherein the container-based cluster includes a plurality of worker nodes that cause a virtualized container to execute processing of an application and a master node configured to manage the worker nodes, one or more of the applications being made redundant in the plurality of worker nodes, and the redundant applications being installed in different worker nodes, the update control device includes a master node control unit, comprising one or more processors, configured to construct a new master node in a new container-based cluster different from the container-based cluster in an initial state before update, a worker node control unit, comprising one or more processors, configured to construct, in the new container-based cluster, a minimum number of the worker nodes required for a migration target application to execute processing, the migration target application being selected from among the one or more applications installed in the plurality of worker nodes of the container-based cluster in the initial state and indicating an application that is a target to be sequentially migrated to the new container-based cluster, and that delete a worker node in which the application is no longer installed due to deletion of the migration target application from the container-based cluster in the initial state, and add the number of deleted worker nodes to the new container-based cluster, an application management unit, comprising one or more processors, configured to install the migration target application in the minimum required number of constructed worker nodes and delete the migration target application from the container-based cluster in the initial state, a load balancer control unit, comprising one or more processors, configured to communicatively connect the worker node in which the migration target application is installed and the load balancer, and a state acquisition unit, comprising one or more processors, configured to inquire the master node of the container-based cluster in the initial state or the new container-based cluster to check normality of each process related to update, and the update control device is configured to:

sequentially select the migration target application in the container-based cluster in the initial state to cause the application management unit to install the migration target application in a worker node of the new container-based cluster constructed by the worker node control unit, repeat deletion of the migration target application from the container-based cluster in the initial state in the application management unit and deletion of a worker node in which the application is not installed in the worker node control unit to migrate all applications, and delete the master node of the container-based cluster in the initial state in the master node control unit to update the container-based cluster in the initial state to the new container-based cluster, and in a case where there is a process of which normality cannot be checked as a result of checking the normality in the state acquisition unit, return to immediately before the process and execute the process again.

4. An update control device configured to control update of a container-based cluster including a plurality of worker nodes that cause a virtualized container to execute processing of an application and a master node configured to manage the worker nodes, one or more of the applications being made redundant in the plurality of worker nodes, and the redundant applications being installed in different worker nodes, the update control device comprising:

a master node control unit, comprising one or more processors, configured to construct a new master node in a new container-based cluster different from the container-based cluster in an initial state before update;

a worker node control unit, comprising one or more processors, configured to construct, in the new container-based cluster, a minimum number of the worker nodes required for a migration target application to execute processing, the migration target application being selected from among the one or more applications installed in the plurality of worker nodes of the container-based cluster in the initial state and indicating an application that is a target to be sequentially migrated to the new container-based cluster, and delete a worker node in which the application is no longer installed due to deletion of the migration target application from the container-based cluster in the initial state, and add the number of deleted worker nodes to the new container-based cluster;

an application management unit, comprising one or more processors, configured to install the migration target application in the minimum required number of constructed worker nodes and delete the migration target application from the container-based cluster in the initial state, a load balancer control unit, comprising one or more processors, configured to communicatively connect the worker node in which the migration target application is installed and the load balancer configured to allocate a processing request to each of the applications; and a state acquisition unit, comprising one or more processors, configured to inquire the master node of the container-based cluster in the initial state or the new container-based cluster to check normality of each process related to update, wherein the update control device is configured to:

sequentially select the migration target application in the container-based cluster in the initial state to cause the application management unit to install the migration target application in a worker node of the new container-based cluster constructed by the worker node control unit, repeat deletion of the migration target application from the container-based cluster in the initial state in the application management unit and deletion of a worker node in which the application is not installed in the worker node control unit to migrate all applications, and delete the master node of the container-based cluster in the initial state in the master node control unit to update the container-based cluster in the initial state to the new container-based cluster, and in a case where there is a process of which normality cannot be checked as a result of checking the normality in the state acquisition unit, return to immediately before the process and execute the process again.

* * * * *